United States Patent
Van Eijndhoven

(10) Patent No.: US 7,428,615 B2
(45) Date of Patent: Sep. 23, 2008

(54) SYSTEM AND METHOD FOR MAINTAINING COHERENCY AND TRACKING VALIDITY IN A CACHE HIERARCHY

(75) Inventor: Josephus Theodorus Johannes Van Eijndhoven, Eindhoven (NL)

(73) Assignee: NXP, B.V., Eindhoven (NL)

( * ) Notice: Subject to any disclaimer, the term of this patent is extended or adjusted under 35 U.S.C. 154(b) by 147 days.

(21) Appl. No.: 10/530,143

(22) PCT Filed: Oct. 1, 2003

(86) PCT No.: PCT/IB03/04329

§ 371 (c)(1),
(2), (4) Date: Mar. 31, 2005

(87) PCT Pub. No.: WO2004/031962

PCT Pub. Date: Apr. 15, 2004

(65) Prior Publication Data

US 2006/0053254 A1    Mar. 9, 2006

(30) Foreign Application Priority Data

Oct. 4, 2002   (EP) .................................. 02079126

(51) Int. Cl.
*G06F 12/08* (2006.01)
(52) U.S. Cl. ...................... 711/122; 711/141; 711/145; 711/156
(58) Field of Classification Search .................. None
See application file for complete search history.

(56) References Cited

U.S. PATENT DOCUMENTS 6,751,705 B1 *  6/2004  Solomon et al. ............. 711/122
2002/0087791 A1 *  7/2002  Arimilli et al. .............. 711/122

* cited by examiner

*Primary Examiner*—B. James Peikari

(57) ABSTRACT

A data processing system according to the invention comprises a processor (P) and a memory hierarchy. The highest ranked level therein is a cache coupled to the processor. The memory hierarchy comprises a higher ranked cache (C1) having a cache controller (CC1) operating according to a write allocate scheme, and a lower ranked cache (C2) is coupled to the higher ranked cache (C1) having a cache controller (CC2). The size of the higher ranked cache is smaller than the size of the lower ranked cache. Both caches (C1, C2) administrate auxiliary information (V1, V2) indicating whether data (D1, D2) present therein is valid. The line size of the lower ranked cache (C2) is an integer multiple of the line size of the higher ranked cache (C1). The auxiliary information (V1) in the higher ranked cache (C1) concerns data elements (D1) at a finer granularity than that in the lower ranked cache (C2). The higher ranked cache (C1) is arranged for transmitting a write mask (WM) to the lower ranked cache (C2) in conjunction with a line of data (DL) for indicating which data in the lower ranked cache (C2) is to be overwritten at the finer granularity. Fetching a line from the next lower ranked level (M) is suppressed if the write mask (WM) indicates that the line (DL) provided by the higher ranked cache (C1) is entirely valid in which case, the controller (CC2) of the lower ranked cache allocates the cache line in the lower ranked cache (C2) without fetching it.

6 Claims, 3 Drawing Sheets

Figure 1:
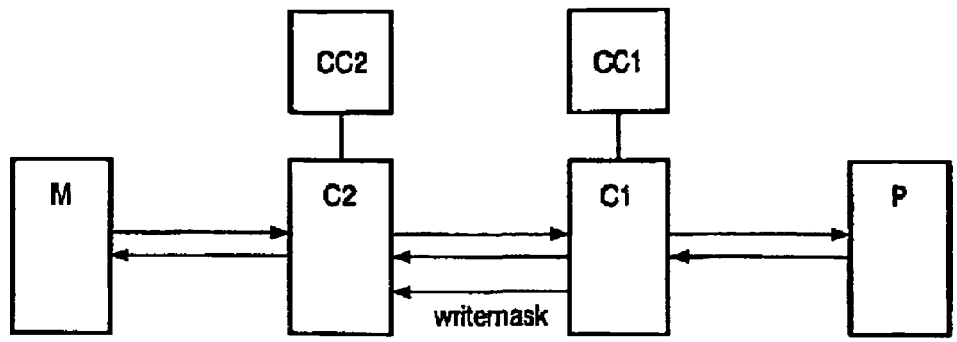

SYSTEM AND METHOD FOR MAINTAINING COHERENCY AND TRACKING VALIDITY IN A CACHE HIERARCHY

The invention pertains to a data processing system having a hierarchical memory organization. The hierarchical organization of the memory serves to bridge the gap between fast processor cycle time and slow memory access time. Typically such a memory hierarchy comprises a relatively small but fast first level cache (highest ranked) coupled to the processor, and a slower, but relatively large second level cache coupled to said first level cache. The next lower ranked level may be a main memory but it may alternatively be a further, larger cache between the second level cache and the memory. At the lowest ranked level the memory hierarchy has for example a mass storage medium as a magnetic or an optical disc. Otherwise the main memory may be provided with data via a transmission system, such as a network or a modem connection. A more detailed description of some of the basic concepts discussed in this application is found in a number of references, including Hennessy, John L., et al., Computer Architecture—A Quantitative Approach" (Morgan Kaufmann Publishers, Inc., San Mateo, Calif., 1990). Hennessy's text, particularly Chapter 8, provides an excellent discussion of cache memory issues addressed by the present invention.

Many cache controllers employ a "fetch-on-write" scheme. That means that on a write miss a full cache line is fetched from memory, inserted in the cache, and the addressed word is updated in the cache. This line remains in the cache for some time, anticipating further writes in the same area. This scheme is generally chosen as it hopefully reduces the amount of memory traffic, since most writes will hit in the cache and do not directly generate memory traffic. This scheme requires an administration of 2 bits per cache line (besides the data content and the address tag), to indicate that the address tag is (in)valid and that the data content is clean or dirty (has been written to). A 'dirty' cache line is written back to memory when the cache wants to re-use that location for a new word, or (exceptionally) when an explicit 'flush' operation is executed by the processor.

When operating on streaming (multi-media) data, tasks normally distinguish input and output streams. Output streams are written by the processor to a memory-based buffer. For such streams (such writes) the 'fetch-on-write' policy generates useless memory traffic (causing power dissipation and time delay) by first fetching the memory block into the cache. Furthermore, efficiency is reduced by the latency of reading the data into the cache before the write operation can be completed. Clearly this read data is useless and will all be overwritten.

A known technique to avoid 'fetch-on-write' on a write miss is a 'no-write-allocate' scheme, where the write data just bypasses the cache. This scheme does not provide the normally desired reduction in memory traffic.

A less used technique avoids 'fetch-on-write' in a write allocate scheme. This technique adds more bits to the cache administration: a 'valid' bit for each data byte of every cache line. Per cache line, this set of 'data-valid' bits now replaces the single 'dirty' bit. Such a processing system, in accordance with the opening paragraph, is known from U.S. Pat. No. 5,307,477. Upon a write miss, a new cache line is 'allocated' (it is given a location in the cache, the address tag and 'address-valid' bit are set), and the write operation is completed by inserting only the actually written bytes and setting the corresponding 'data-valid' bits. When this cache line needs to be flushed to memory, only part of its data might be 'valid', which is normally served by a memory system which allows a 'byte dirty mask' to be specified with memory write operations. Clearly this scheme totally avoids the 'fetch-on-write', at the cost of an extensive cache administration (valid bit per byte) and a more elaborate memory interface (having additional wires to transmit a 'dirty mask').

It is a purpose of the intention to reduce memory traffic and reduce memory latency penalty by avoiding useless 'fetch-on-writes', while maintaining the total amount of auxiliary data modest in comparison to the total size of the memory hierarchy. According to the invention the data processing system is characterized by the characterizing features of claim 1.

In the data processing system according to the invention useless fetch-on-writes are avoided, as the cache controller of the lower ranked cache recognises from the write mask whether the higher ranked cache replaces a subset of a cache line in the lower ranked cache, or replaces an entire cache line. If a subset of the cache line is to be replaced it is necessary to first fetch that cache line from the next lower level in the memory hierarchy, if it was not already available in the lower ranked cache. However, if the higher ranked cache replaces an entire cache line in the lower ranked cache, the cache controller of the lower ranked cache recognises this from the write mask and avoids an unnecessary fetch on write. As the fetch on write is avoided in those cases the operational speed of the data processing system as a whole is improved. Although the higher ranked cache maintains a relatively extensive administration, the total administration overhead is modest, as the auxiliary information in the lower ranked cache concerns data elements at a courser granularity than that in the lower ranked cache, and because the higher ranked cache is smaller than the lower ranked cache.

The invention is in particular advantageous to multiprocessor systems as claimed in claim 2. In this way the frequency that two processors need to simultaneously access the shared memory is reduced. This contributes to the operational speed of the multiprocessor system. In order to achieve the best results, preferably, each of the processors in the multiprocessor system has its own memory hierarchy as defined in claim 1.

The ratio between the line size of the lower ranked cache and the higher ranked cache may be an integer multiple greater than one, for example two. In that case, if the higher ranked cache writes a first line in the line of the lower ranked cache for which the write mask indicates that its content is fully replaced, the lower ranked cache typically has a 'data valid' bit for each of the two halves, and the lower ranked cache can allocate a new large cache line, store the written data, and set only the corresponding 'data valid' bit. A second write from the higher-ranked cache with a complete write mask to the alternative half of the lower-ranked cache can make the larger cache line complete. Alternatively, if a second write for which the write mask indicates that its content is partially replaced, then it is necessary to fetch an entire line in said lower ranked cache first. The data which is fetched then also includes data at the locations which were already written during the first write from the higher-level cache. In this situation, the data arriving from the memory is merged with the data already in the cache, in such a way that the data which was written to the cache before, which is identified through the 'data valid' bits, prevails over the data which is read from the memory. Subsequently, the data which arrives from the memory is partially overwritten in the lower-ranked cache by the data arriving from the higher-ranked cache as indicated by the write mask. In the preferred embodiment of claim 3 the merging with data already in the lower-ranked cache is not needed and it suffices to merge with the date from the higher-ranked cache according to the write mask.

In the embodiment of claim 4 data allocation in the cache as result of write misses occur totally separate from data allocation as result of read misses in a separate read cache. This separation of read versus write cache allocation areas helps to improve system performance in particular in the case of streaming data, as the allocation for writes cannot cause potentially valuable read data to be pushed out of the cache. In case of separated read and write caches additional (known) techniques are required to maintain a consistent memory view between the caches. In general this would require the address of read operations to be checked for in write cache, and upon a match, either directly read from the write cache or cause a flush to memory in the write cache.

The embodiment of claim 5 is a very cost-effective solution. Simulations have shown that even in a processing system according to the invention wherein the higher ranked cache has only one line results in a substantial reduction in the communication bandwidth of the background memory.

Figure 2:
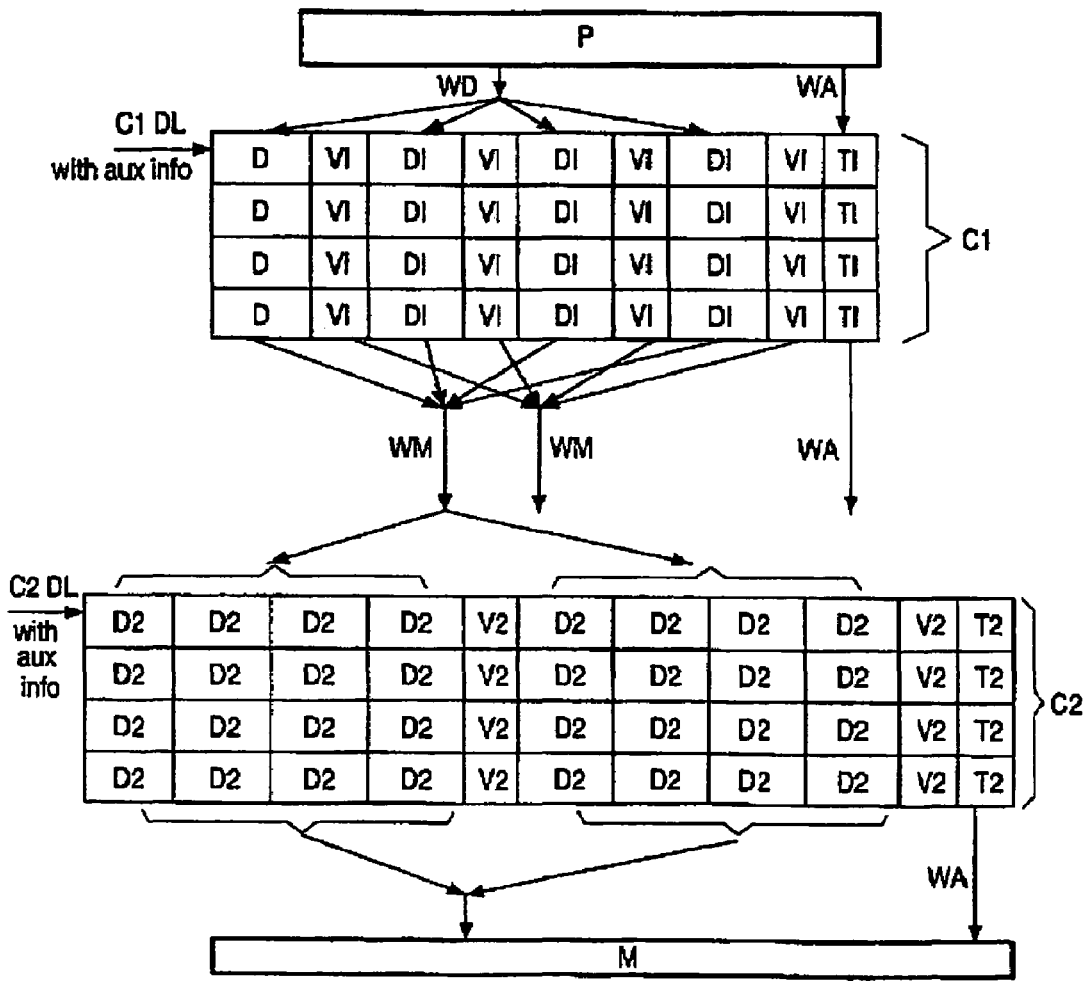
Figure 3:
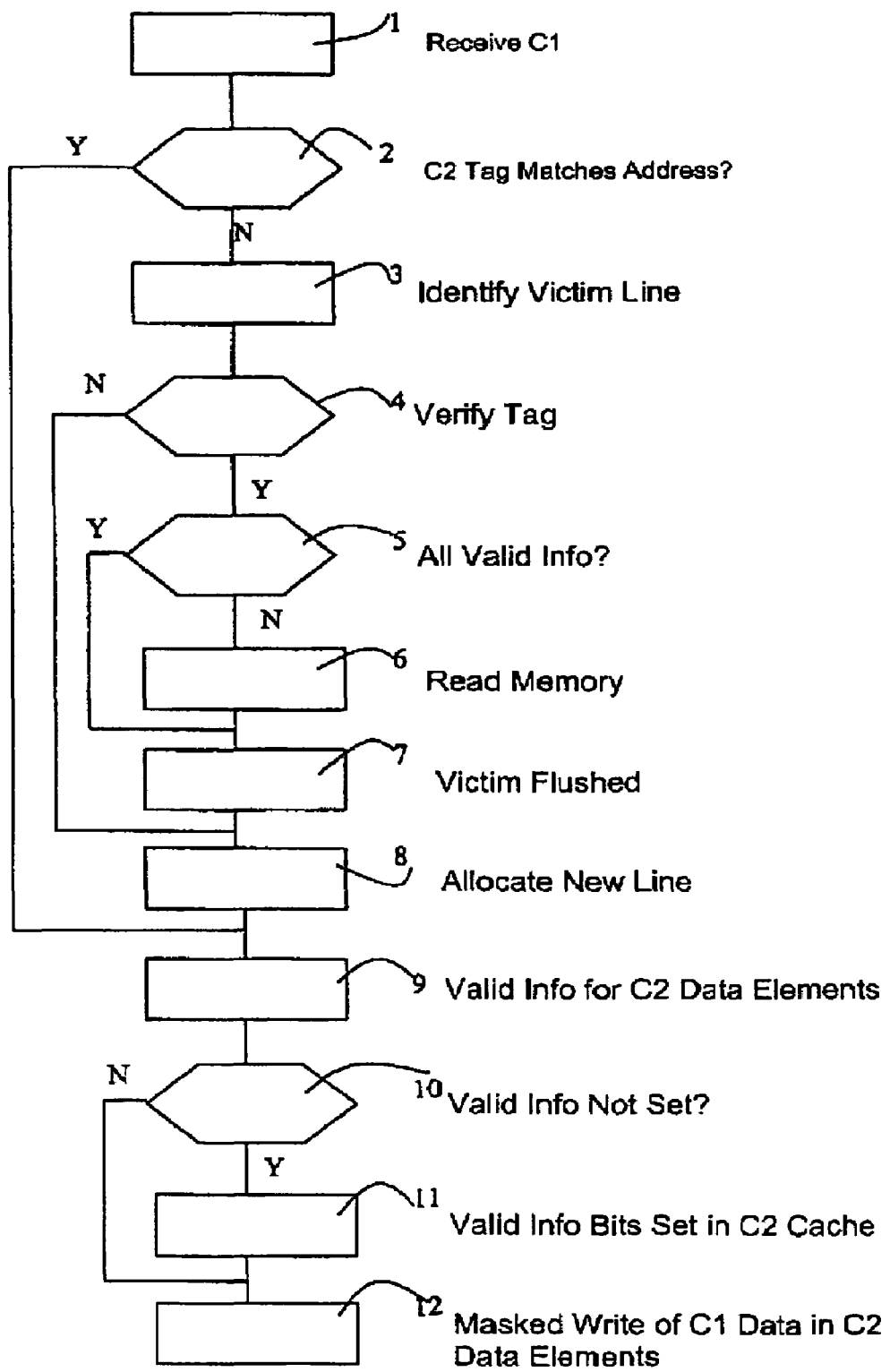
Figure 4:
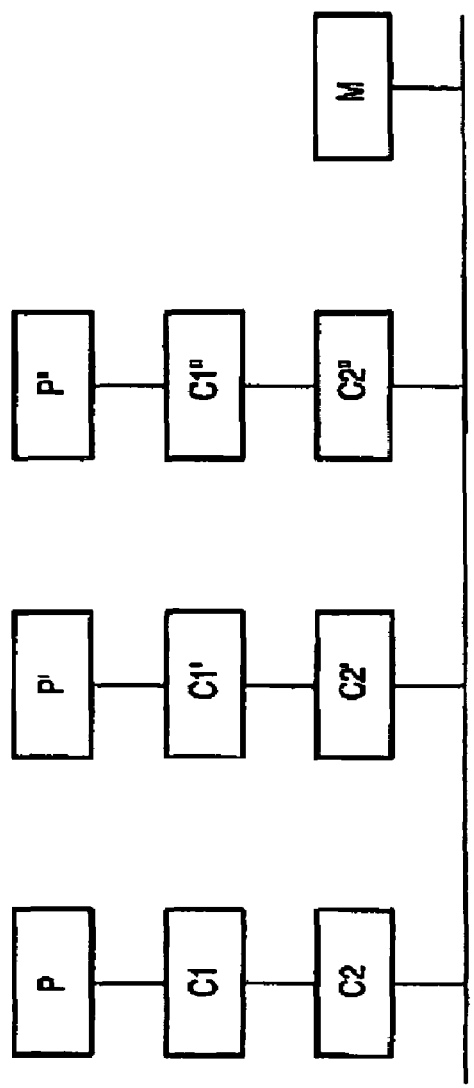

These and other aspects of the invention are described in more detail with reference to the drawing. Therein FIG. 1 schematically shows a first embodiment of a data processing system suitable for implementation of the invention, FIG. 2 shows a portion of FIG. 1 in more detail, FIG. 3 schematically illustrates a method of operating a data processing system according to the invention, FIG. 4 schematically shows a second embodiment of a data processing system suitable for implementation of the invention.

A higher ranked cache C1 in the memory hierarchy has a cache controller CC1 operating according to a write allocate scheme, and a lower ranked cache C2 is coupled to the higher ranked cache C1 and has a cache controller CC2. In the embodiment shown the higher ranked cache is also the highest ranked (first level) cache C1, and the lower ranked cache is second level cache C2. However, for the purpose of the invention it is sufficient that the higher ranked cache and the lower ranked cache are two mutually successive caches in the memory hierarchy, for example the second and the third level cache. Usually the highest level cache is direct mapped, or set associative with small sets. This contributes to response speed. Lower level caches usually are set associative with relatively large sets, so as to increase the hit-rate.

The size of the higher ranked cache C1 is smaller than the size of the lower ranked cache C2. Both caches administrate auxiliary information indicating whether data present therein is valid.

The lower ranked cache on its turn is coupled to a main memory M.

In order to illustrate the invention the lower C2 and the higher ranked cache C1 are shown in more detail in FIG. 2.

In the embodiment shown the higher ranked cache C1 has 4 lines. Each line comprises a tag info unit, which indicates the memory address corresponding to the data in said cache line. The data includes here 4 data elements D1. In addition the cache lines store auxiliary information V1 in the form of validity bits, one validity bit for each data element.

Typically, C1 would have a 'valid' bit V1 per byte in the L1 cache line (the granularity of processor write operations). A preferred embodiment would match FIG. 2 with the choice of having a 'valid' bit in C2 at the granularity of C1 cache lines. An alternative embodiment could have 'valid' bits V2 in C2 at the granularity of (4-byte or 8-byte) words.

The data processing system of the invention is characterized in that, the line size of the lower ranked cache C2 is an integer multiple of the line size of the higher ranked cache C1. In the embodiment shown in FIG. 2 the line sizes of the lower ranked cache C2 is twice that of C1, i.e. A line in C2 comprises twice the number of data elements as compared to a line in C1. The auxiliary information V1 in the higher ranked cache C1 relates to data elements at a finer granularity than that in the lower ranked cache C2. More in particular, in the higher ranked cache C1, the cache lines comprise auxiliary info (valid info) V1 indicating the validity of each data element D1. In the lower ranked cache the valid info V1 relates to the granularity of four data elements (corresponding to the size of a higher level cache line) D2. The higher ranked cache C1 is arranged for transmitting a write mask WM to the lower ranked cache C2 in conjunction with a line of data DL for indicating which data in the lower ranked cache C2 is to be overwritten at the finer granularity. The write mask WM is constituted from the 4 valid bits V1 that belong to one C1 cache line.

The operation of a data processing system according to the invention is further described with reference to FIG. 3.

In step 1 C2 receives C1 cache line with write mask and address.

In step 2 it is verified whether a tag in C2 matches the address

If such a tag is not found (N) then step 3 is executed, wherein a 'victim' line is identified in C2 which may be replaced. Several strategies, which are outside the scope of the invention can be applied to select a line to replace. Well known is for example the least recently used (LRU) method. Otherwise a random selection method may be applied for example.

Step 3 is followed by step 4 wherein it is verified whether this 'victim' tag info has 'address valid' and 'dirty'.

If this is true (Y) then it is verified in step 5 whether this 'victim' tag info has all 'valid info' bits set. If this is not the case(N) then step 6 is executed wherein A Read from memory is issued for C2 victim line content The victim is updated with memory data where 'valid info' is not set. All 'valid info' bits of this victim cache line are set.

Step 6 is followed by step 7 wherein this victim line is flushed to memory. If the outcome of the test in step 5 is affirmative (Y) then step 6 is skipped and step 7 is executed immediately.

Step 7 is followed by step 8 wherein the new line is allocated, involving the following operations The tag info is set to new address, The address is set valid, all 'valid info' bits are reset.

If the outcome of step 4 is negative step 8 is executed immediately, skipping step 5, 6 and 7.

Step 8 is followed by step 9. Therein for the one line in C2 with (now) matching tag it is determined whether the 'valid info' like for the data elements in C2 which match the address is set. Step 9 is executed immediately if the outcome of the test in step 2 is affirmative.

Step 9 is followed by step 10 wherein it is verified whether this 'valid info' is not set AND write mask is only partially set.

If this condition is fulfilled then step 11 is executed involving the following operations A read from memory for C2 cache line content is issued, Parts in C2 cache line with memory data where 'valid info' is not set are updated, All 'valid info' bits of this C2 cache line are set.

Step 11 is followed by step 12 comprising the following sub steps

A masked write of C1 data in C2 data elements is performed 'valid info' is set for this cache location 'dirty bit' is set in the 'tag info' for this C2 cache line Step 12 is executed immediately if the outcome of the test in step 10 is negative.

FIG. 4 shows a second embodiment of the invention, wherein the data processing system comprises one or more further processors P, P', P", and wherein the memory hierarchy C1, C2, M of processor P comprises a memory having a rank which is lower than the rank of said lower ranked cache and which is shared with said other processors. In the embodiment shown each of the processors in the multiprocessor system has its own memory hierarchy, hierarchy of processor P' comprising higher ranked cache C1' and lower ranked cache C2'. The hierarchy of processor P" comprises higher ranked cache C1" and lower ranked cache C2".

The invention claimed is:

1. A data processing system comprising a processor and a memory hierarchy, wherein the highest ranked level in the hierarchy is a cache coupled to the processor, wherein a higher ranked cache in the memory hierarchy has a cache controller operating according to a write allocate scheme, a lower ranked cache is coupled to the higher ranked cache and has a cache controller, wherein the size of the higher ranked cache is smaller than the size of the lower ranked cache, wherein both caches administrate auxiliary information indicating whether data present therein is valid, wherein, the line size of the lower ranked cache is an integer multiple of the line size of the higher ranked cache, wherein the auxiliary information in the higher ranked cache concerns data elements at a finer granularity than the auxiliary information in the lower ranked cache and wherein the higher ranked cache is arranged for transmitting a write mask to the lower ranked cache in conjunction with a line of data for indicating which data in the lower ranked cache is to be overwritten at the finer granularity, the cache controller of the lower ranked cache being arranged for fetching a cache line from the next lower ranked level in the memory hierarchy if the cache line is not cached yet and the write mask indicates that the data in the line provided by the higher ranked cache is only partially valid, and wherein fetching the cache line from said next lower ranked level is suppressed if the write mask indicates that the line provided by the higher ranked cache is valid in accordance with the courser granularity of the auxiliary information in the lower ranked cache, in which case, the controller of the lower ranked cache allocates the cache line in the lower ranked cache without fetching the cache line from the next lower ranked level.

2. Data processing system according to claim 1, comprising one or more further processors, and wherein the memory hierarchy comprises a memory having a rank which is lower than the rank of said lower ranked cache and which is shared with said other processors.

3. Data processing system according to claim 1, wherein the cache lines of the lower ranked cache and the higher ranked cache have the same number of data elements.

4. Data processing system according to claim 1, wherein the higher ranked cache is a write only cache.

5. Data processing system according to claim 1, wherein the higher ranked cache has exactly one cache line.

6. Method for operating a data processing system comprising a processor and a memory hierarchy, wherein the highest ranked level in the hierarchy is a cache coupled to the processor, wherein a higher ranked cache in the memory hierarchy has a cache controller operating according to a write allocate scheme, a lower ranked cache is coupled to the higher ranked cache and has a cache controller, wherein the size of the higher ranked cache is smaller than the size of the lower ranked cache, wherein both caches administrate auxiliary information indicating whether data present therein is valid, wherein, the line size of the lower ranked cache is an integer multiple of the line size of the higher ranked cache, wherein the auxiliary information in the higher ranked cache concerns data elements at a finer granularity than the auxiliary information in the lower ranked cache, according to which method the higher ranked cache transmits a write mask to the lower ranked cache in conjunction with a line of data for indicating which data in the lower ranked cache is to be overwritten at the finer granularity, the cache controller of the lower ranked cache fetches a cache line from the next lower ranked level in the memory hierarchy if the cache line is not cached yet and the write mask indicates that the data in the line provided by the higher ranked cache is only partially valid, and wherein fetching the cache line from said next lower ranked level is suppressed it the write mask indicates that the line provided by the higher ranked cache is valid in accordance with the courser granularity of the auxiliary information in the lower ranked cache, in which case, the cache controller of the lower ranked cached allocates the cache line in the lower ranked cache without fetching the cache line from the next lower ranked level.

* * * * *